United States Patent
Li et al.

(10) Patent No.: US 12,353,848 B2
(45) Date of Patent: Jul. 8, 2025

(54) VALIDATING CODE OWNERSHIP OF SOFTWARE COMPONENTS IN A SOFTWARE DEVELOPMENT SYSTEM

(71) Applicant: Maplebear Inc., San Francisco, CA (US)

(72) Inventors: Aoshi Li, Toronto (CA); Kevin Green, Toronto (CA); Zhongqiang Liang, Fremont, CA (US); Francois Campbell, Toronto (CA); Mengyu Zhang, Chestnut Hill, MA (US)

(73) Assignee: Maplebear Inc., San Francisco, CA (US)

( * ) Notice: Subject to any disclaimer, the term of this patent is extended or adjusted under 35 U.S.C. 154(b) by 82 days.

(21) Appl. No.: 18/213,773

(22) Filed: Jun. 23, 2023

(65) Prior Publication Data
US 2024/0427559 A1    Dec. 26, 2024

(51) Int. Cl.
*G06F 8/20* (2018.01)
*G06F 8/70* (2018.01)

(52) U.S. Cl.
CPC .. *G06F 8/22* (2013.01); *G06F 8/70* (2013.01)

(58) Field of Classification Search
CPC ........................................ G06F 8/22; G06F 8/70
USPC ................................. 717/120–140; 706/25–45
See application file for complete search history.

(56) References Cited

U.S. PATENT DOCUMENTS

| | | | | |
|---|---|---|---|---|
| 5,163,016 A | * | 11/1992 | Har'El | G06F 30/30 716/102 |
| 5,291,598 A | * | 3/1994 | Grundy | H04L 9/3236 726/28 |
| 8,311,967 B1 | * | 11/2012 | Lin | G06N 5/04 706/62 |
| 8,438,551 B2 | * | 5/2013 | Tonkin | G06F 8/42 717/137 |
| 10,748,155 B1 | * | 8/2020 | Walters | G06Q 20/40145 |
| 11,403,234 B2 | * | 8/2022 | Durham | H04L 9/0894 |
| 11,620,128 B1 | * | 4/2023 | Chawda | G06F 8/75 717/120 |
| 11,664,126 B2 | * | 5/2023 | Baron | G06Q 50/00 706/45 |

(Continued)

OTHER PUBLICATIONS

Wen et al, "Code Ownership in Open-Source AI Software Security", ACM, pp. 28-35 (Year: 2024).*

(Continued)

*Primary Examiner* — Anil Khatri
(74) *Attorney, Agent, or Firm* — Fenwick & West LLP

(57) ABSTRACT

A system validates code ownership of software components identified in a build process. The system receives a pull request identifying a set of software components. The system analyzes code ownership of each software component using machine learning. The system provides features describing the software components as input to a machine learning model. The system determines based on the output of the machine learning model, whether the code ownership of the software component can be determined accurately. If the system determines that a software component identified by the pull request cannot be determined with high accuracy, the system may block the pull request or send a message indicating that the code ownership of a software component cannot be determined accurately.

17 Claims, 4 Drawing Sheets

(56) References Cited

U.S. PATENT DOCUMENTS

| | | | | |
|---|---|---|---|---|
| 11,710,070 B2* | 7/2023 | Shi | ............. | G06N 3/042 |
| | | | | 706/12 |
| 11,726,769 B2* | 8/2023 | McMahan | ............. | G06N 3/084 |
| | | | | 717/171 |
| 11,790,233 B2* | 10/2023 | Goodfellow | ............. | G06N 3/045 |
| | | | | 706/25 |
| 11,907,983 B2* | 2/2024 | Kirwin | ............. | G06Q 30/0609 |
| 12,081,629 B1* | 9/2024 | Wei | ............. | G06F 8/60 |
| 12,216,692 B1* | 2/2025 | Rogynskyy | ............. | G06F 16/334 |
| 2019/0303140 A1* | 10/2019 | Kelly | ............. | G06N 3/08 |
| 2023/0169170 A1* | 6/2023 | Yaron | ............. | G06F 21/577 |
| | | | | 726/1 |

OTHER PUBLICATIONS

Foucault et al, "Code Ownership in Open-Source Software", ACM, pp. 1-9 (Year: 2014).*

Ghaffarian et al, "Software Vulnerability Analysis and Discovery Using Machine-Learning and Data-Mining Techniques: A Survey", ACM, pp. 1-36 (Year: 2017).*

Indykov, "Component-based Approach to Software Engineering of Machine Learning-enabled Systems", ACM, pp (Year: 2024).*

Elsafi et al, "Inferring Approximated Models for Integration Testing of Component-based Software", IEEE, pp. 1-5 (Year: 2014).*

* cited by examiner

VALIDATING CODE OWNERSHIP OF SOFTWARE COMPONENTS IN A SOFTWARE DEVELOPMENT SYSTEM

TECHNICAL FIELD

One or more aspects described herein relate generally to continuous integration and deployment of software and more specifically to validation of code ownership in software development systems in a continuous integration pipeline.

BACKGROUND

Organizations use various systems for development of software. A code repository is used for storing software developed by users. A build process is performed that includes various stages, for example, compilation of code, testing, staging, generation of software artifacts, deployment in a production environment, and so on. During the execution of a continuous integration pipeline, checks are performed at a given stage to determine whether the system should proceed to the next stage of the pipeline. For example, if a pull request is received, an approval by a code owner may be required before proceeding to the next stage. The system determines code ownership of the software components identified in a pull request to identify reviewers for the pull request. Code ownership of software components may be obtained from multiple sources within the code repository, for example, from a code ownership file or from comments within software components. Code ownership obtained from the different sources can be inconsistent with each other. As a result, the system is unable to determine the code ownership reliably, thereby making it challenging to execute the continuous integration pipeline.

SUMMARY

In accordance with one or more aspects of the disclosure, a system validates code ownership of software components in a build process. The system receives a pull request during a build process. The pull request identifies a set of software components. Each software component is associated with one or more code owners. The system analyzes code ownership of each software component using machine learning. For each software component identified in the pull request, the system extracts a set of features. The set of features include at least a feature describing users associated with the software component. The system provides the set of features as input to a machine learning model. The machine learning model is trained to output a score indicating an accuracy of known code ownership of the software component. The system determines based on the score, whether the code owner associated with the software component can be determined accurately. If the system determines that the code ownership of one or more software components identified by the pull request cannot be determined accurately, the system may block the pull request or send a message indicating that the code ownership of a software component needs to be determined.

According to an embodiment, the system receives user feedback on the predictions of the machine learning model and retrains the machine learning model based on the user feedback.

Figure 1:
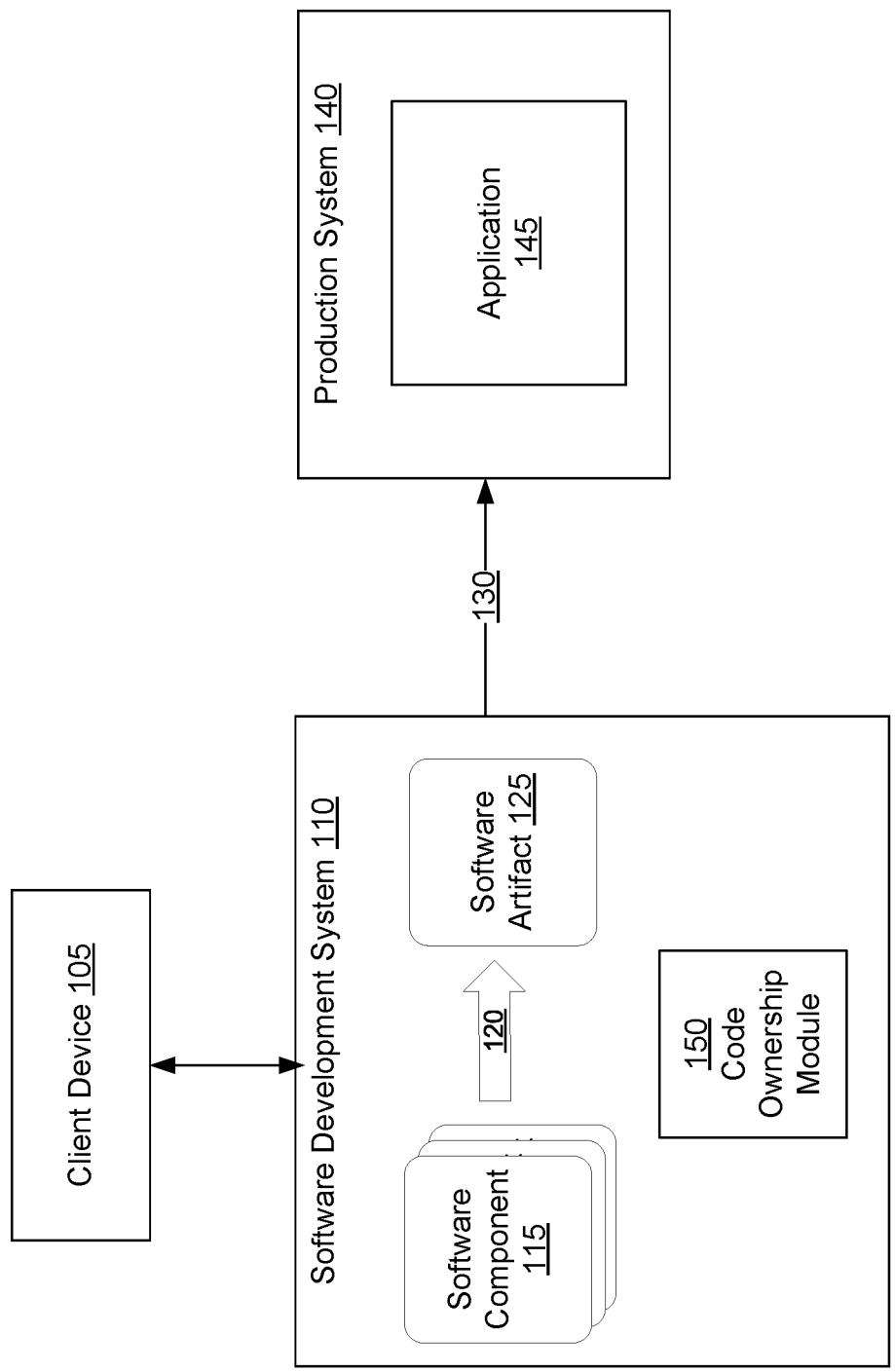
FIG. 1 shows the overall system environment for development and deployment of software, according to one or more embodiments.

The figures depict various embodiments for purposes of illustration only. One skilled in the art will readily recognize from the following discussion that alternative embodiments of the structures and methods illustrated herein may be employed without departing from the principles of the present disclosure.

The features and advantages described in this summary and the following detailed description are not all-inclusive. Many additional features and advantages will be apparent in view of the drawings, specification, and claims.

DETAILED DESCRIPTION

Code ownership concerns assigning the responsibility of code to a user or a group of users. Code ownership associates code with a user or users who manage development and delivery of the code in a build process, for example, a continuous integration pipeline. Code with well-established owners is known to have fewer software defects compared with code without well-established owners. Code owners of a software component typically review any modifications made to the software components by other software developers. A software component may also be referred to herein as a software module. Examples of software components are classes, functions, methods of classes, files, directories, and so on. A software component comprises instructions representing code.

Some software repositories such as Github™ allows developers to maintain an ownership file (e.g., a CODE-OWNERS file) that associates each software component with user accounts or users that are code owners of the software component. Code owners in an organization often change due to various reasons, for example, due to reorganization of personnel that results in reassignment of developers to different projects, due to developers leaving the organization and new developers joining the organization, and so on. As a result, an ownership file that stores code owners for various software components can get outdated if the ownership file is not updated on a regular basis. Ownership of software components may also be specified within the software components, for example, as comments. As a result, code ownership may be specified in multiple locations. Often the code ownership specified in different locations are inconsistent with each other since code ownership specified in one location may be updated while the code ownership specified in another location gets outdated. As a result, determining code ownership of a software component can be challenging.

A system according to various embodiments uses machine learning models to determine whether the code ownership of a software component can be determined accurately. Various features describing software components are provided as input to the machine learning model, for example, users that made modifications to the software component, information describing the modifications, and so on. The machine learning model is trained to predict accuracy of code ownership of software components identified in a pull request. The system uses the prediction to determine whether to block or continue execution of the continuous integration pipeline.

Overall System Environment

FIG. 1 shows the overall system environment for development and deployment of software, according to one or more embodiments described herein. The overall system environment comprises one or more client devices 105, a software development system 110, and a production system 140. Other embodiments may include more, fewer, or different systems than those indicated in FIG. 1. For example, there may be systems for testing and staging of software being deployed. Functionality indicated herein as being performed by a particular system/module may be performed by other systems/modules.

Users such as developers use client devices 105 to interact with the software development system 110 in connection with development of software. The software being developed typically comprises software components 115. Typically, a build process 120 is executed to generate a software artifact 125 from the software components. The build process may perform operations such as compiling software components and packaging the compiled software components to obtain the software artifact 125. There may be other steps in the build process, for example, testing, staging, review by other users, and so on. The software artifact 125 is deployed 130 to a production system 140, for example, to be incorporated in an application 145.

In a software development system 110, developers modify code in a branch of a main project repository and periodically merge the code changes of one or more software components with the main project repository. A request to merge such changes is referred to as a pull request or a merge request. The pull request identifies one or more software components 115. The software components 115 are processed according to a build process to generate a software artifact 125. The software artifact is deployed in the production system 140. The software artifact may be an executable that represents the application 145 that is deployed on the production system 140. The software artifact may be a library that is used by an application 145 running on the production system 140.

The build process may be implemented as a continuous integration pipeline comprising a set of stages, each stage representing one or more tasks associated with the build process. The system executes a stage of the continuous integration pipeline and determines whether the next stage can be executed. Each stage of the continuous integration pipeline may specify a criterion for determining whether the system should proceed with execution of the subsequent stage of the pipeline. A stage may specify that at least a threshold percentage of a set of test cases must be executed successfully in order to proceed to the next stage. A stage may specify that when a user or a set of users have given approval, the system may proceed to the next stage. For example, a stage may identify a set of software components identified in a pull request submitted by a developer and specify that if the code owners of the respective software components have reviewed the changes submitted by the developer via the pull request, the system may proceed to the next stage. As a result, the system needs to accurately identify the code owners of the software components identified in the pull request to be able to send requests for review and approval from the respective code owners.

The software development system 110 executes a machine learning model to determine whether the code ownership of the software components 115 identified in the pull request can be determined accurately. If the software development system 110 determines based on the prediction of the machine learning model that the code ownership of a software component 115 identified in a pull request cannot be determined accurately, the software development system 110 may block the execution of the continuous integration pipeline corresponding to the pull request. The software development system 110 may send a request for confirming the code ownership of that software component. Once the code ownership of the software component is confirmed, the software development system 110 continues execution of the continuous integration pipeline. Alternatively, if the software development system 110 determines based on the prediction of the machine learning model that the code ownership of all software components 115 identified in the pull request can be determined accurately, the software development system 110 continues execution of the continuous integration pipeline.

The various systems shown in FIG. 1 typically interact with each other using a network (not shown in the figure), for example, via the Internet. In one or more embodiments, the network uses standard communications technologies and/or protocols. The data exchanged over the network can be represented using technologies and/or formats including the hypertext markup language (HTML), the extensible markup language (XML), etc. In addition, all or some of links can be encrypted using encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

FIG. 1 and the other figures use like reference numerals to identify like elements. A letter after a reference numeral, such as "115(a)," indicates that the text refers specifically to the element having that particular reference numeral. A reference numeral in the text without a following letter, such as "115," refers to any or all of the elements in the figures bearing that reference numeral (e.g. "115" in the text refers to reference numerals "115(a)" and/or "115(n)" in the figures).

System Architecture

Figure 2:
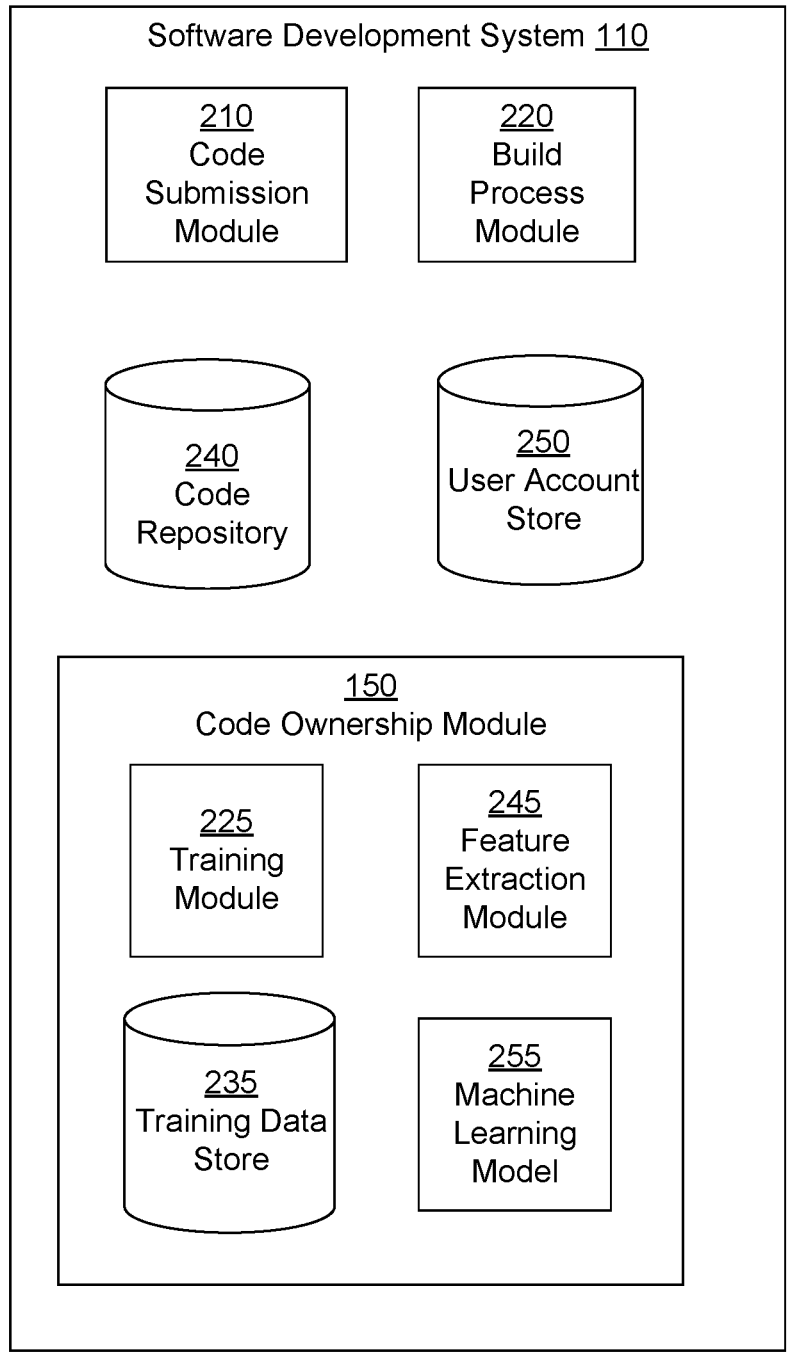
FIG. 2 shows the system architecture of a software development system, according to one or more embodiments.

FIG. 2 shows the system architecture of a software development system, according to one or more embodiments described herein. The software development system 110 comprises a code submission module 210, a build process module 220, a deployment module 230, a code repository 240, a user account store 250, and a code ownership module 260. Other embodiments may include more or fewer modules than indicated here. Functionality indicated as being performed by a particular module may be performed by other modules. The software development system 110 may be a distributed system such that different modules are executed by different computing systems.

The code repository 240 stores code being developed by developers of an organization. The code may comprise multiple software components. A software component may represent a file, a class, a function, or another unit of code. The code repository may allow developers to create branches of code for making changes independent of other developers. Developers make changes to code in a branch. The changes may be implemented to introduce a new feature or to fix defects in existing features. When the changes are tested and determined to be working, the developer typically merges the changes to a main branch of the code.

The code submission module 210 allows developers to submit changes to code. A developer may make changes to code in a branch of a code and submit a pull request via the code submission module 210 to check-in the code and possibly merge the code with the main branch. The pull request may identify one or more software components that represent changes to the code. The code submission module 210 allows multiple developers to collaborate with each other. An example of code submission module 210 is GITHUB.

The build process module 220 implements various tasks of a build process. According to an embodiment, the build process module 220 implements a continuous integration pipeline comprising a set of stages, each stage representing one or more build tasks. Examples of build tasks include compilation of software components, execution of test cases, sending software components for review, getting approval from users, and so on. The build process may generate a software artifact, for example, an executable file, a library, or a system image for deployment in a production environment.

The user account store 250 stores user accounts of various users involved in a development process including software developers, quality assurance people, system integration developers, and so on. The user account store 250 may also store associations between users, for example, information identifying teams of users. One or more users may be associated with a software component as code owners of the software component.

The code ownership module 260 determines code owners for various software components. According to an embodiment, the code ownership module 260 uses a machine learning model 255 for predicting information associated with code ownership. The code ownership module 260 comprises a training module 225, a feature extraction module 245, a training data store 235 and a machine learning model 255. Other embodiments may include more or fewer modules than indicated here.

The feature extraction module 245 extracts various features describing a software component for providing as input to the machine learning model 255. The following are examples of the features extracted by the feature extraction module 245 that are provided as input to the machine learning model 255. A feature may represent information identifying developers that are authors of the software component. The code repository 240 or the code submission module 210 may provide a command or application programming interface (API) that returns all the users (or developers) that made changes to the software component. An example of such a command is the "git blame" command of GITHUB. An example feature input to the machine learning model 255 represents the current and previous teams of the authors identified in the previous feature. An example feature represents a percentage of the software component that was modified by each user. For example, if the software component was modified by a set of users, the system identifies the number of lines that were modified by the user and calculates a percentage of the total number of lines of the software component that were modified by the user. This percentage modified of the software component is determined for each user that modified the software component in the past. An example feature represents a number of times a software component was changed. An example feature represents a rate at which the software component was modified in terms of a number of modifications in a unit time, for example, a week. An example feature represents a set of timestamps corresponding to the changes made to the software component, for example, provided as a vector or a list of timestamps. An example feature represents one or more known code owners of the software component. For example, the system may determine a code owner of the software component based on the code ownership file of the code repository and provide the code owner as a feature. The system may determine a code owner of the software component based on comments in the software component and provide that as a feature. According to one or more embodiments, the system provides a feature identifying the code owners for the software component along with the source of information used to determine the code owner. Other features that are extracted and provided as input to the machine learning model include: the code ownership file of the code repository; comments in the software component and provide that as a feature; authors of the changed software components based on git blame; manual markings of whether the file's owner needs to be changed (Only required once for the initial training); the authors' previous and current teams; the percentage of the software components touched by various authors; the number of times this software component is changed; the timestamps of the changes of this software component and others.

According to one or more embodiments, the machine learning model 255 predicts a score indicating an accuracy with which the code ownership of a software component can be determined based on the information stored in the code repository or any information available in the system. The system uses the score output by the machine learning model to determine whether the code ownership of the software component needs to be changed. For example, if the score output by the machine learning model 255 for an input software component is below a threshold value, the system determines that the code ownership of the software component cannot be determined accurately and needs to be changed. Alternately, if the score output by the machine learning model 255 for the input software component meets or exceeds the threshold the system determines that the code ownership of the software component can be determined accurately and does not need to be changed. The code ownership of a software component may be determined based on the code ownership file of the code repository 240 or based on comments in the code.

According to one or more embodiments, the machine learning model is trained to input information associated with a software component as well as information identifying a user (e.g., a developer, or the like) and output a score indicating whether the user is a code owner of the software component. The features of the software component input to the machine learning model are as described herein. The machine learning model may be invoked for different users to identify the code owner for the software component. If the score for all users associated with a software component is below a threshold value, the system may determine that the inventorship of the software component cannot be determined accurately. If the score for one or more users meets or exceeds a threshold value, the system may select the user indicated as having the highest score as the code owner for the software component.

According to an embodiment, the machine learning model is a supervised learning based logistic regression model but is not limited to a specific type of machine learning model, for example, the system may use a decision tree based machine learning model. The training module 225 trains the machine learning model 255 using training data stored in the training data store 235. The training data used for training the machine learning model 255 may be generated from software components that have known code owners. According to one or more embodiments, the system makes recommendations to users based on the output of the machine learning model 255 and receives feedback indicating whether the users agree with the prediction made using the machine learning model 255. For example, a user interface may present the prediction to a user and allow the user to make a selection (e.g., using a widget such as a checkbox) indicating that the user agrees with the prediction or disagrees with the prediction. According to an embodiment, the system uses reinforcement learning to automatically improve the machine learning model 255 based on the user feedback related to the predictions. According to an embodiment, the system receives user feedback on the predictions of the machine learning model and retrains the machine learning model based on the user feedback The system, for example, the software development system 110 may take various types of actions based on the predictions of the machine learning model 255. For example, the system may use the prediction made by the machine learning model 255 to determine whether to block a pull request from being merged with a main branch by returning an error associated with a continuous integration pipeline corresponding to the pull request. According to an embodiment, the system may update a user interface of the code submission module 210 to indicate that a merge of the software components of the pull request is disabled. For example, a button that allows a developer to approve the merge operation may be disabled so that the developer is blocked from merging the pull request.

According to an embodiment, the system sends a message indicating that the code owner of a particular software component of the pull request is outdated and needs to be updated. The system provides a message representing an explanation describing why the code owner file is outdated. For example, the system may provide one or more features that were input to the machine learning model 255 to make the prediction. According to an embodiment, the system provides a user interface that allows the user to ignore the prediction of the machine learning model 255. For example, if the machine learning model 255 predicts that the code ownership of a software component is outdated, the user may indicate via the user interface that the system should ignore the prediction of the machine learning model and continue the execution of the continuous integration pipeline. The user input may be used for future training of the machine learning model 255.

According to an embodiment, the system executes the machine learning model 255 for each software component of the repository, for example, as a background process such as a Cron job (or any mechanism for scheduling tasks) to identify software components that have outdated code ownership so that a user can review and fix the code ownership if needed, in advance of the software component being specified in a pull request.

Overall Processes

Figure 3:
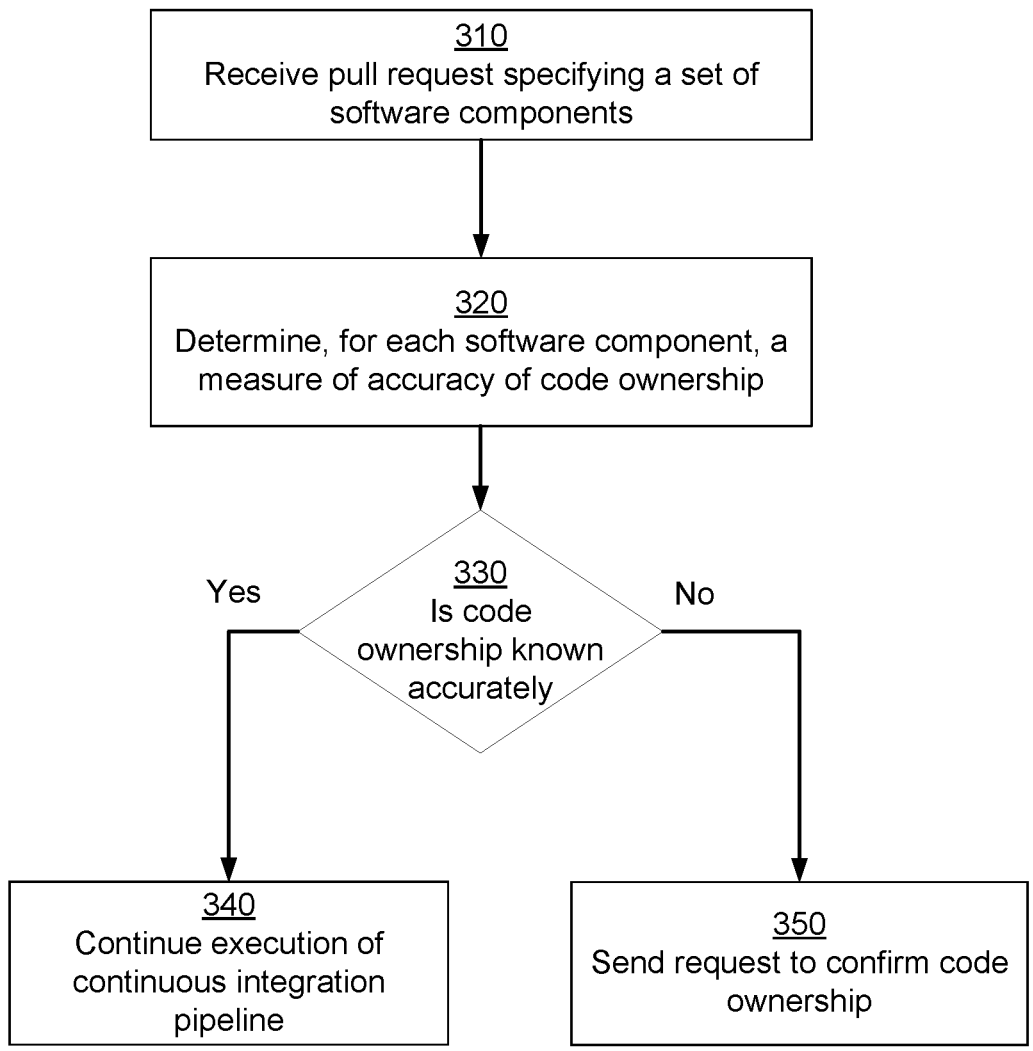
FIG. 3 shows the overall process for development and deployment of software in a continuous integration pipeline, according to one or more embodiments.

FIG. 3 shows the overall process for development and deployment of software in a continuous integration pipeline, according to one or more embodiments described herein. The steps shown in the flowchart may be executed in an order different from that indicated. For example, certain steps may be executed in parallel. The steps may be performed by modules other than those indicated herein.

The code submission module 210 receives 310 a pull request. The pull request may be associated with a continuous integration pipeline. The pull request identifies one or more software components. A software component may be a file but is not limited to files. For example, a software component may be a class or a function or a set of classes or a set of functions. The set of software components is analyzed by the code ownership module 150. Accordingly, for each software component of the set of software components, the code ownership module 150 determines 320 a measure of accuracy of the code ownership. The build process module 220 determines 330 based on the measure of accuracy of the code ownership of various software components of the set, whether the code ownership for the set of software components is known accurately. If the build process module 220 determines 330 that the code ownership for the set of software components is known accurately, the build process module 220 continues 340 execution of the continuous integration pipeline or the subsequent step of the build process. If the build process module 220 determines 330 that the code ownership for the set of software components is not known accurately, the build process module 220 sends 350 a request to confirm the code ownership of the software components identified in the pull request. According to an embodiment, the build process module 220 identifies one or more software components in the request to confirm the code ownership. A system administrator or an expert user may follow a process to confirm the code ownership of the identified one or more software components. The build process may be continued after the code ownership of the software component is updated by the expert users.

Figure 4:
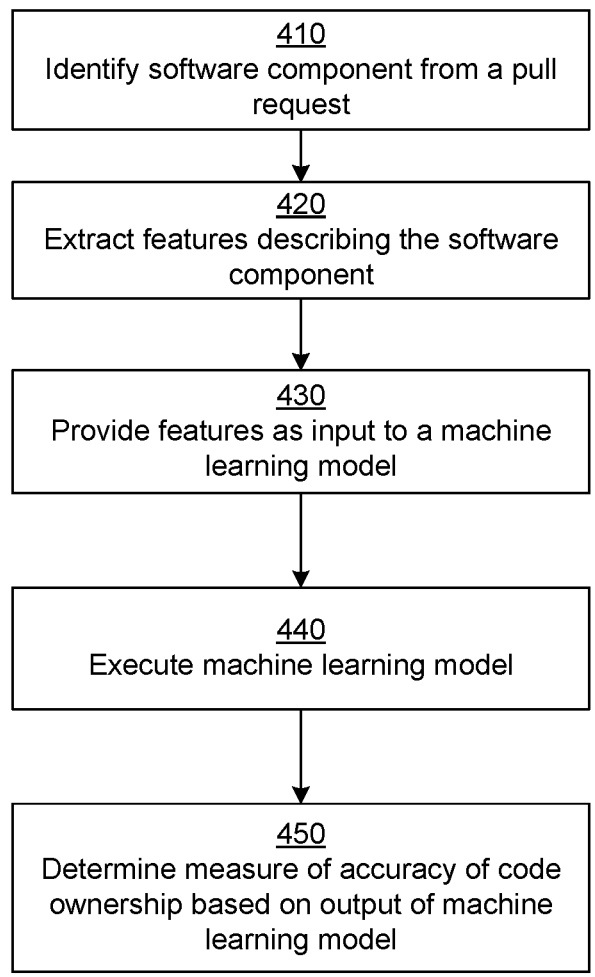
FIG. 4 shows the overall process for validations of code ownership in a software development system, according to one or more embodiments.

FIG. 4 shows the overall process for validation of code ownership in a software development system, according to one or more embodiments described herein. The steps shown in the flowchart may be executed in an order different from that indicated. For example, certain steps may be executed in parallel. The steps may be performed by modules other than those indicated herein.

The code ownership module 150 identifies 410 a software component specified in a pull request. The feature extraction module 245 extracts 420 features describing the software components. The code ownership module 150 provides 430 the extracted features as input to the machine learning model 255. The code ownership module 150 executes 440 the machine learning model 255. The code ownership module 150 determines 450 the measure of accuracy of the code ownership of the software component based on the output of the machine learning model 255. The system takes appropriate action associated with the build process based on the output of the machine learning model.

The techniques disclosed herein allow the continuous integration pipeline to be executed efficiently and accurately. For example, systems that are unable to determine whether the code ownership is known accurately may send the request for approval to incorrect users causing delays in the build process. The use of a machine learning model helps the system efficiently and accurately make a determination whether the system can proceed with the next stage of the build. This allows efficient execution of the continuous integration pipeline and also helps conserve computational resources, for example, storage resources, network resources, and so on.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
    at a computer system comprising a processor and a computer-readable storage medium:
        receiving a pull request associated with a build process, the pull request identifying a set of software components, each software component associated with a code owner;
        for each of the set of software components:
            extracting a set of features describing the software component, the set of features comprising at least a feature describing users associated with the software component,
            providing the set of features as input to a machine learning model trained to output a score indicating an accuracy of known code ownership of the software component, and
            executing the machine learning model on the set of features to determine the score indicating whether the known code ownership of the software component is accurate; and
        responsive to determining that the known code ownership of one or more software components from the set of software components has accuracy below a threshold value, performing an action associated with the build process,
        wherein determining based on the score predicted by the machine learning model whether the known code ownership of the software component is accurate comprises comparing the score with a threshold value and determining based on a result of comparison whether the known code ownership of the software component is accurate.

2. The method of claim 1, wherein responsive to determining the accuracy is below the threshold value, performing the action associated with the build process comprises blocking the pull request.

3. The method of claim 1, wherein responsive to determining the accuracy is below the threshold value, wherein performing the action associated with the build process comprises sending a message indicating that the code owner of the one or more software components is inaccurate.

4. The method of claim 1, wherein the feature identifies a set of users that modified the software component.

5. The method of claim 4, wherein the set of features comprises a feature indicating a number of times the software component was modified.

6. The method of claim 1, wherein the set of features comprises a feature representing a set of timestamps when the software component was modified.

7. The method of claim 1, further comprising:
    receiving user feedback describing predictions of the machine learning model; and
    retraining the machine learning model based on the user feedback.

8. A non-transitory computer readable storage medium storing instructions that when executed by one or more computer processors cause the one or more computer processors to perform steps comprising:
    receiving a pull request associated with a build process, the pull request identifying a set of software components, each software component associated with a code owner;

for each of the set of software components:
- extracting a set of features describing the software component, the set of features comprising at least a feature describing users associated with the software component,
- providing the set of features as input to a machine learning model trained to output a score indicating an accuracy of known code ownership of the software component, and
- executing the machine learning model on the set of features to determine the score indicating whether the known code ownership of the software component is accurate; and responsive to determining that the known code ownership of one or more software components from the set of software components has accuracy below a threshold value, performing an action associated with the build process, wherein determining based on the score predicted by the machine learning model whether the known code ownership of the software component is accurate comprises comparing the score with a threshold value and determining based on a result of comparison whether the known code ownership of the software component is accurate.

9. The non-transitory computer readable storage medium of claim 8, wherein responsive to determining the accuracy is below the threshold value, performing the action associated with the build process comprises blocking the pull request.

10. The non-transitory computer readable storage medium of claim 8, wherein responsive to determining the accuracy is below the threshold value, performing the action associated with the build process comprises sending a message indicating that the code owner of the one or more software components is inaccurate.

11. The non-transitory computer readable storage medium of claim 8, wherein the feature identifies a set of users that modified the software component.

12. The non-transitory computer readable storage medium of claim 11, wherein the set of features comprises a feature indicating a number of times the software component was modified.

13. The non-transitory computer readable storage medium of claim 8, wherein the set of features comprises a feature representing a set of timestamps when the software component was modified.

14. The non-transitory computer readable storage medium of claim 8, wherein the instructions cause the one or more computer processors to further perform steps comprising:

receiving user feedback describing predictions of the machine learning model; and
retraining the machine learning model based on the user feedback.

15. A computer system comprising:
one or more computer processors; and
a non-transitory computer readable storage medium storing instructions that when executed by one or more computer processors cause the one or more computer processors to perform steps comprising:
  receiving a pull request associated with a build process, the pull request identifying a set of software components, each software component associated with a code owner;
  for each of the set of software components:
    extracting a set of features describing the software component, the set of features comprising at least a feature describing users associated with the software component,
    providing the set of features as input to a machine learning model trained to output a score indicating an accuracy of known code ownership of the software component, and
    executing the machine learning model, on the set of features to determine the score indicating whether the known code ownership of the software component is accurate; and
  responsive to determining that the known code ownership of one or more software components from the set of software components has accuracy below a threshold value, performing an action associated with the build process,
  wherein determining based on the score predicted by the machine learning model whether the known code ownership of the software component is accurate comprises comparing the score with a threshold value and determining based on a result of comparison whether the known code ownership of the software component is accurate.

16. The computer system of claim 15, wherein the feature identifies a set of users that modified the software component.

17. The computer system of claim 15, further comprising:
receiving user feedback describing predictions of the machine learning model; and
retraining the machine learning model based on the user feedback.

* * * * *